3,322,347
DUAL PURPOSE ROTARY MOWER WASHER AND SPRINKLER DEVICE

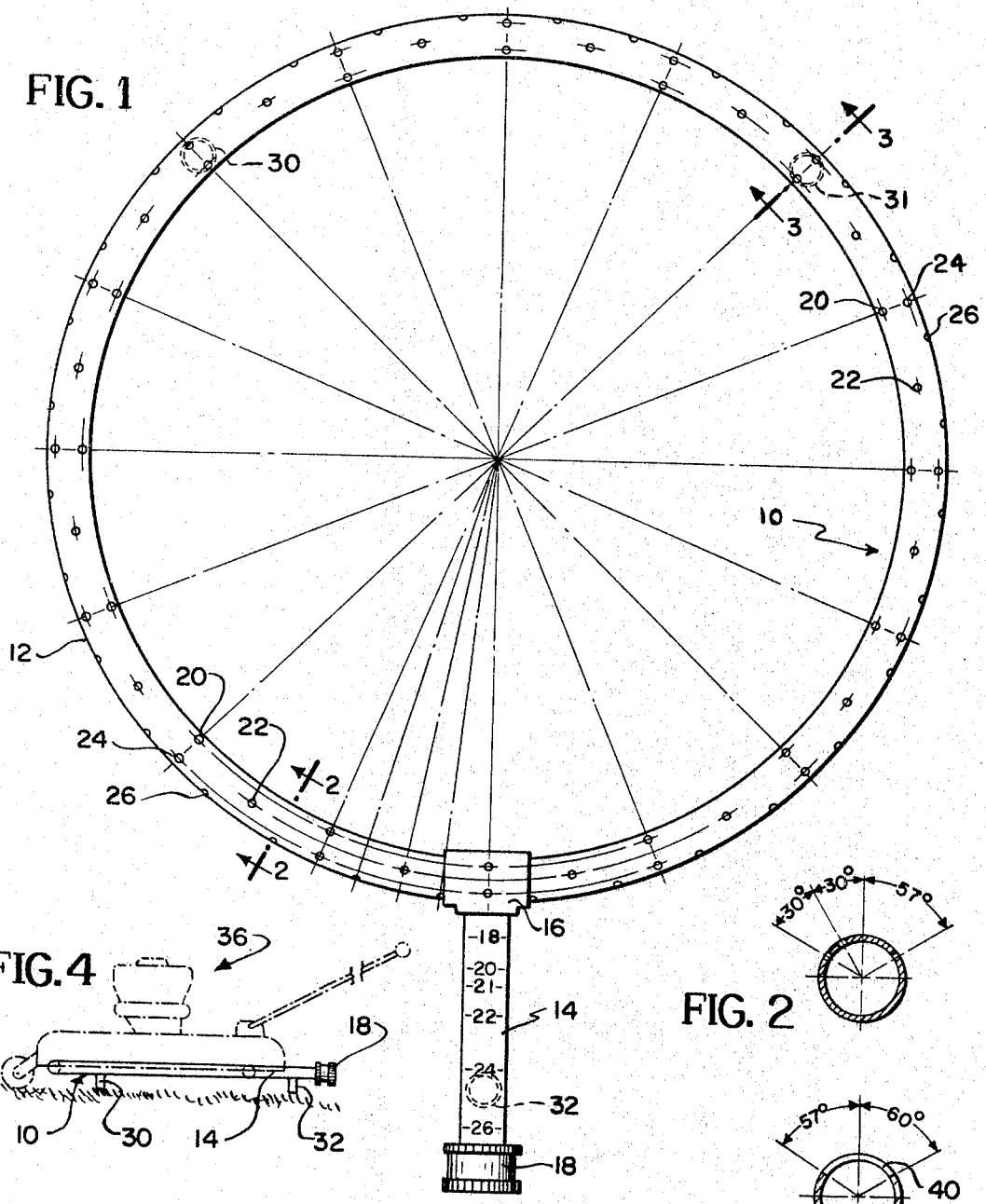

Carroll L. Pierce, 7608 S. Drew, Hinsdale, Ill. 60521
Filed Aug. 2, 1965, Ser. No. 476,575
2 Claims. (Cl. 239—73)

This invention relates to a combination rotary mower washer and lawn sprinkler and more particularly to a combination rotary mower washer for cleaning the underside of the mower shroud and blade and lawn sprinkler which is particularly adapted for watering a small area or spot.

In the past, numerous rotary mower washers and a whole host of various types of water sprinklers have been devised. Each of these have had their attributes, however, in a great many cases the washers and sprinklers have been generally unsatisfactory, for one reason or another. More important still, these prior washers and sprinklers are generally only applicable for their intended use and cannot be used for the dual function of cleaning the underside of a rotary mower shroud and for sprinkling the lawn or, in the event they are so used, the results are less than desirable.

Accordingly, it is an object of the present invention to provide an improved sprinkler device which is applicable for both washing the underside of a rotary mower shroud and blade and for sprinkling an area of a lawn.

It is another object of the invention to provide a combination rotary mower washer and lawn sprinkler which is constructed so as to eliminate the need for lifting or tilting a mower for cleaning by hand, either by scraping or brushing, so that the hazard of the mower falling, or cutting the hands, fingers or arms on the blade, is completely eliminated.

It is a still further object of the invention to provide a combination rotary mower washer and lawn sprinkler constructed in a fashion such that when used to wash the mower the water jets are confined within the motor shroud so that small children will not be attracted by their fountain-like dispersion of water.

It is a still further object to provide a rotary mower washer which may be used to sprinkle an area of a lawn.

It is a still further object of the invention to provide a sprinkler which is adapted to water an area of a lawn and which may be used with equal effectiveness to clean the underside of a rotary mower shroud and blade.

It is a still further object of the invention to provide a combination rotary mower washer and lawn sprinkler which is relatively simple in construction and requires virtually no maintenance.

It is a still further object of the invention to provide a combination rotary mower washer and lawn sprinkler which eliminates the hazard of inhaling dust from dried grass masses which normally accumulate on the underside of a rotary mower shroud which may contain various chemicals such as arsenic, lime or weed killers, which are very detrimental to health.

Other objects of the invention will in part be obvious and will in part appear hereinafter.

The above objectives are accomplished with a combination rotary mower washer and lawn sprinkler device which generally comprises a tubular ring having a lead-in tube, the latter of which is clearly marked to indicate the position in which the device is to be placed under the mower. A plurality of orifices for water jets are arranged radially about the tubular ring and in such a manner that virtually the entire underside of the rotary mower shroud and blade is impinged with water. The orifices for the water jets are also formed in a manner such that some of the jets of water are impinged on one another so that they are substantially diffused and form a blanket of water over a small area, while other ones of the orifices for the water jets are arranged so as to throw and diffuse the water in a circle at a distance away from the device. An effective "spot" lawn sprinkler is thus provided.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

FIGURE 1 is a top plan view of a combination rotary mower washer and lawn sprinkler device exemplary of the present invention;

FIGURE 2 is a sectional view of the device, taken along lines 2—2 of FIG. 1;

FIGURE 3 is a sectional view of the device, taken along lines 3—3 of FIG. 1;

FIGURE 4 is a view illustrating how the device is positioned beneath a rotary mower; and FIGURE 5 is a view illustrating how the water jets are diffused and are thrown a distance away from the device.

Similar reference characters refer to similar parts throughout the several views of the drawing.

Referring now to FIG. 1 of the drawing which illustrates a combination rotary mower washer and lawn sprinkler device 10 exemplary of the present invention, it can be seen that the device 10 comprises a tubular, substantially circular spray tube 12 having a lead-in tube 14 fixedly secured within a T-shaped coupler 16 which is used to couple the ends of the circular spray tube 12 and the lead-in tube 14 together. A hose coupler 18 is fixedly secured to the end of the lead-in tube 14, for attaching a garden hose or the like thereto, in the well known manner. The spray tube 12, the lead-in tube 14 and the T-shaped coupler 16 can be separate pieces which are assembled to form the device 10 or, if molded, they can be formed as an integral unit.

As can be best seen in FIGS. 1 and 2, a plurality of orifices, generally indicated with the reference numeral 20, are formed in the spray tube 12, in a radial fashion about a first circumference, and are preferably positioned at an angle of 57° from a vertical axis through the spray tube. The jets of water from the orifices 20 will impinge upon one another at the center of the spray tube 12, in the absence of an obstruction such as the underside of a rotary motor shroud or blade. A number of other radially positioned orifices, generally indicated by the reference numeral 22, are formed about a second circumference of the spray tube, and are preferably aligned with the vertical axis of the spray tube. Other orifices, generally indicated by the reference numerals 24, are radially positioned about a third and a fourth circumference of the spray tube, at 30° and 60° angles with respect to the vertical axis thereof, respectively. The orifices 20, 22, 24 and 26 are preferably .010 to .0625 inch in diameter.

The lead-in tube 14 has a number of designations thereon consisting generally of a line and a numeral. The numerals correspond to the size of the most commonly available conventional rotary power mowers, such as a 20-inch mower or a 24-inch mower, and function to indicate the position in which the device 10 is to be placed under a rotary mower.

A pair of legs 30 and 31 are provided on the underside of the spray tube 12 and a similar leg 32 is provided beneath the lead-in tube 14, which legs support the washer and sprayer device 10 above the ground.

In operation, as can be best seen in FIG. 4, the washer and sprayer device 10 is placed under a rotary mower 36, to the position indicated on the lead-in tube 14 which corresponds to the size of the rotary mower, and the water turned on. The water jets from the orifices 20 formed in the spray tube 12 impinge upon and clean the center area of the mower shroud, the blade shaft, the blade and the blade fastenings. The swirling water which runs off from the underside of the shroud cleans the top center area of the blade. Some of the other jets of water from the orifices 20 do not strike the above objects, but continue at an angle and strike the mower shroud in areas otherwise not cleaned by the impinging jets. The water jets from the vertical orifices emerge in a fan-shape and wash the mower shroud in an area which partially overlaps the area washed by the water jets from the orifices 20. The water from the orifices 22 which runs off of the mower shroud also cooperates to wash the top center area of the mower blade. The water jets from the orifices 24 and 26 clean the balance of the underside of the mower shroud, consisting of the outer horizontal and vertical sides of the mower shroud and partially overlaps the area washed by the water jets from the orifices 22. In this case also, the water which runs off assists in cleaning the top outer area of the blade.

From the above description, it can be seen that the device 10 when properly positioned beneath a rotary mower, in accordance with the designations on the lead-in tube 14, provides a plurality of water jets which are entirely confined within the mower shroud and which impinge on the underside of the mower shroud at different angular positions, and partly in overlapped relationship, so that the mower shroud and blade of the rotary mower is efficiently cleaned.

Referring now to FIG. 5, the effectiveness of the washer and sprayer device 10 for "spot" sprinkling is illustrated. As there illustrated, the jets of water from the orifices 20 are directed so that they impinge upon one another and in so doing the jets are diffused so as to form substantially a mist above the central portion of the spray tube 12. Also, the jets of water from the orifices 22 are projected vertically and are somewhat diffused and merged with the mist provided from the jets of water from the orifices 20. Some of the jets of water from the orifices 20 will also impinge on the water jets from the orifices 22 to further diffuse them so that the expanse of the mist provided by the jets of water from the orifices 20 and 22 is considerably expanded. The mist will eventually fall and settle on the ground about this area of the washer and sprayer device 10 so that this area can be completely saturated with water. Also, since the water jets are diffused into a mist and are not directly impinged on the ground about this area, the grass and the like will not be subjected to damage or likely to be washed away, as in the case of the prior sprinklers which impinge water directly onto the ground.

The jets of water from the orifices 24 and 26 are thrown outwardly a greater distance from the spray tube 12 and generally impinge upon one another at this greater distance so as to substantially diffuse these jets of water to establish a mist. This mist will likewise settle to the ground, at a greater distance from the device than the mist created by the jets of water from the orifices 20 and 22. A fairly substantial "spot" of a lawn can therefore be sprinkled with the washer and sprinkler device 10 of the present invention.

The diameter of the spray tube 12 when used with mowers 18–26 inches in size preferably has a diameter from 10–18 inches, and for use with mowers of this size, a diameter of 14 5/16" is preferred. The orifices 20 may fall within a range of 55–65° from the vertical axis, however, an angle of 57° is preferred. The orifices 24 and 26 may fall within a range of 25–35° from the vertical axis and 55–65° from the vertical axis, respectively. The orifices 24 and 26 are, however, preferably at 30° and 60° angles from the vertical axis, respectively. When the washer and sprinkler device 10 is constructed in the preferred manner, it functions most properly both as a rotary mower washer and as a lawn sprinkler.

In FIG. 3 there is illustrated an alternate construction wherein the orifices are in the form of slots 40 which extend radially inwardly and radially outwardly from the vertical axis of the spray tube 12. The outer limits of the slots are at maximum angles of 65° from the vertical axis and are preferably at an angle of 57° toward the center of the spray tube and at an angle of 60° toward the outside of the spray tube, which angles correspond to the preferred position of the outermost orifices 20 and 26. The slots 40 are preferably .015 inch in width and provide a fan-shaped spray of water which substantially corresponds to the pattern formed by the orifices 20, 22, 24 and 26.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A combination rotary mower washer and lawn sprinkler device comprising a tubular, substantially circular shaped ring having a lead-in tube for conveying a source of water to said ring and a plurality of orifices formed therein, said orifices being radially positioned about said ring and positioned so as to define four spaced circumferences, the orifices on one of said circumferences being formed at an angle within a range of 55° to 65° from the upper extremity of a vertical axis through said ring, the orifices on a second one of said circumferences being formed on the top of said ring and in alignment with said vertical axis, said orifices on a third one of said circumferences being formed at an angle within a range of 25° to 35° from the upper extremity of said vertical axis, and the orifices on the fourth one of said circumferences being formed at an angle within a range of 55° to 65° from the upper extremity of said vertical axis, and numerical indications on said lead-in tube for indicating the proper position for said device beneath a rotary mower.

2. A combination rotary mower washer and lawn sprinkler device comprising a tubular, substantially circular shaped ring having a lead-in tube for conveying a source of water to said ring and a plurality of orifices formed therein, said orifices being substantially from .010 to .0625 inch in diameter and being radially positioned about said ring and positioned so as to define four spaced circumferences, the orifices on one of said circumferences being formed at an angle within a range of 55° to 65° from the upper extremity of a vertical axis through said ring, the orifices on a second one of said circumferences being formed on the top of said ring and in alignment with said vertical axis, said orifices on a third one of said circumferences being formed at an angle within a range of 25° to 35° from the upper extremity of said vertical axis, and the orifices on the fourth one of said circumferences being formed at an angle within a range of 55° to 65° from the upper extremity of said vertical axis, and numerical indications on said lead-in tube for indicating the proper position for said device beneath a rotary mower.

References Cited

UNITED STATES PATENTS

| | | | |
|---|---|---|---|
| 648,263 | 4/1900 | Hull | 239—567 |
| 1,758,767 | 5/1930 | Taggart | 239—567 |
| 2,159,319 | 5/1939 | Cartwright | 239—73 |
| 2,594,476 | 4/1952 | Miller | 239—73 |
| 3,227,379 | 1/1966 | Suchowolec | 239—545 |

FOREIGN PATENTS

| | | |
|---|---|---|
| 12,368 | 6/1896 | Switzerland. |
| 583,989 | 4/1925 | France. |

M. HENSON WOOD, Jr., *Primary Examiner.*

R. S. STROBEL, VAN C. WILKS, *Assistant Examiners.*